US012729570B2

(12) United States Patent
Orzech et al.

(10) Patent No.: US 12,729,570 B2
(45) Date of Patent: Sep. 8, 2026

(54) LOCK FOR A MOTOR VEHICLE

(71) Applicant: Kiekert Aktiengesellschaft, Heiligenhaus (DE)

(72) Inventors: Udo Orzech, Velbert (DE); Heiko Hemmer, Essen (DE)

(73) Assignee: Kiekert Aktiengesellschaft, Heiligenhaus (DE)

( * ) Notice: Subject to any disclaimer, the term of this patent is extended or adjusted under 35 U.S.C. 154(b) by 0 days.

(21) Appl. No.: 19/100,612

(22) PCT Filed: Jul. 19, 2023

(86) PCT No.: PCT/DE2023/100528
§ 371 (c)(1),
(2) Date: Feb. 3, 2025

(87) PCT Pub. No.: WO2024/032843
PCT Pub. Date: Feb. 15, 2024

(65) Prior Publication Data

US 2026/0035967 A1 Feb. 5, 2026

(30) Foreign Application Priority Data

Aug. 9, 2022 (DE) ..................... 10 2022 119 992.4

(51) Int. Cl.
*E05B 81/20* (2014.01)
*E05B 81/66* (2014.01)
*E05B 85/26* (2014.01)

(52) U.S. Cl.
CPC .............. *E05B 81/20* (2013.01); *E05B 81/66* (2013.01); *E05B 85/26* (2013.01)

(58) Field of Classification Search
CPC .......... E05B 81/20; E05B 81/14; E05B 81/66; E05B 85/26; E05B 85/243
(Continued)

(56) References Cited

U.S. PATENT DOCUMENTS 6,053,542 A * 4/2000 Ostrowski .............. E05B 79/20 292/216
6,109,674 A * 8/2000 Bartel ..................... E05B 81/06 292/216
(Continued)

FOREIGN PATENT DOCUMENTS

DE 102006052773 A1 5/2008
DE 102007003948 A1 5/2008
(Continued)

OTHER PUBLICATIONS

International Search Report mailed Oct. 31, 2023, for International Application No. PCT/DE2023/100528.

*Primary Examiner* — Nathan Cumar
(74) *Attorney, Agent, or Firm* — Renner, Otto, Boisselle & Sklar, LLP

(57) ABSTRACT

The invention relates to a lock (1) for a motor vehicle, in particular a tailgate lock, comprising a locking mechanism (2) having a rotary latch (3) and having at least one pawl (4, 5), wherein the rotary latch (3) can be latched in a pre-latching position and a main latching position, having a main latching pawl (5) and having a pre-latching pawl (4), wherein a pre-latching element (17) of the locking mechanism (2) is formed by an angled region of a metallic main body (18) of the rotary latch (3), and wherein the angled region (17) can be placed in engagement with a closing pawl of a closing device.

16 Claims, 2 Drawing Sheets

(58) Field of Classification Search
USPC .......................................................... 292/201
See application file for complete search history.

(56) References Cited

U.S. PATENT DOCUMENTS

| | | | | |
|---|---|---|---|---|
| 6,969,023 | B2 * | 11/2005 | Weller | B60R 22/36 242/383.2 |
| 7,275,771 | B2 * | 10/2007 | Crotti | E05B 81/06 292/201 |
| 8,757,682 | B2 * | 6/2014 | Scholz | E05B 81/20 292/216 |
| 8,894,106 | B2 * | 11/2014 | Vazquez | E05B 81/68 292/201 |
| 8,919,828 | B2 * | 12/2014 | Barth | E05B 85/243 292/201 |
| 2011/0127780 | A1 * | 6/2011 | Barth | E05B 85/243 292/213 |
| 2018/0252004 | A1 * | 9/2018 | Bishop | E05B 81/18 |

FOREIGN PATENT DOCUMENTS

| | | | |
|---|---|---|---|
| DE | 102008048711 | A1 | 3/2010 |
| DE | 102012207443 | A1 | 11/2013 |
| DE | 102018116285 | A1 | 1/2020 |

* cited by examiner

LOCK FOR A MOTOR VEHICLE

This application is a national phase of International Application No. PCT/DE2023/100528 filed Jul. 19, 2023, which claims priority to German Application No. 10 2022 119 992.4 filed Aug. 9, 2022, each of which is hereby incorporated herein by reference in its entirety.

FIELD OF DISCLOSURE

The invention relates to a lock for a motor vehicle, in particular to a motor vehicle side door lock, comprising a locking mechanism with a rotary latch and at least one pawl, wherein the rotary latch can be latched in a pre-latching position and a main latching position, and comprising a main latching pawl and a pre-latching pawl, wherein the pre-latching element of the locking mechanism is formed by an angled region of a metallic main body of the rotary latch.

BACKGROUND OF DISCLOSURE

Locks or locking devices for motor vehicles are used where pivoting or sliding components on the motor vehicle must be secured in their position. To secure the position of the components, the locking device works together with a latch holder, wherein a locking mechanism of the locking device is moved into a locked position by a relative movement of the locking device with respect to a latch holder. Areas of application for these locks include tailgates, doors and sliding doors—and also, for example, backrest locks for rear seats in vehicle interiors. The invention preferably relates to a lock for a tailgate of a motor vehicle.

In order to increase the practicality of the aforementioned locking devices, the locking systems are designed as electrically operable locking systems. Electrically operated locking systems use electric motors that enable a locking mechanism to be unlocked, and thus the lock to be opened electrically. In combination with, for example, a motor-operated tailgate, the operator can open the tailgate via radio remote control without having to manually intervene on the vehicle. In addition to the electrical unlocking of the locking mechanism, so-called closing devices are also used. The closing devices make it possible for a tailgate, or even a side door, once opened, to be moved into its final closed position with electrical assistance.

In order to provide this automatic closing process, the lock must be able to be moved into its final closed position. The motor vehicle lock according to the invention comprises a locking mechanism with a rotary latch and at least one pawl. The rotary latch is pivotably mounted on a metal lock plate and can interact with a latch holder or latch holder bracket attached to the vehicle via an insertion region. When the lock or tailgate or door is closed, the rotary latch is moved from an open position to a first closed position by the relative movement of the latch holder, which is usually fixed to the vehicle.

In a first closed position, which is called the pre-latching position, a pawl engages the rotary latch in such a way that the movement of the rotary latch is blocked. The rotary latch cannot be opened again without moving the pawl. In order to move the rotary latch from this pre-latching position to a main latching position, closing aids are used. These closing devices interact with the locking mechanism in such a way that the rotary latch is transferred from the blocked pre-latching position to a main latching position. In other words, the rotary latch is electrically assisted to move further into its closed position. The closing device moves the rotary latch into the main latching position, in which a pawl—or the same pawl—engages with the rotary latch and blocks the rotary latch in its main latching position. The rotary latch is then in the end position and the door or tailgate is in its final closed position.

In order to be able to reach the main latching position reliably, the rotary latch is moved into an over-travel position by means of the closing device. An over-travel position is one in which the rotary latch is moved further into the closed position than is necessary for the main latching pawl to engage. By moving the rotary latch into the over-travel position, it is possible to ensure that the main latching pawl is securely locked or engaged in the rotary latch. Therefore, this is necessary in particular because it must be ensured that the locking mechanism engages securely in the main latching position even when the door or tailgate is closed electrically.

As described above, a pawl must interact with the rotary latch to achieve the pre-latching position and the main latching position. In this case, it is possible for only one pawl to interact with the rotary latch, or for two or more pawls to be used-which, for example, interact with the rotary latch on different planes. It is also known that, for example, in a main latching position of the locking mechanism, there is an opening moment in the locking mechanism. Opening moment in this case means a force by which the pawl is forced out of the latching position. In order to prevent the locking mechanism from unlocking itself in this case, the pawl is additionally secured in the latching position by means of a latching- or blocking lever.

A locking mechanism having a pre-latching pawl and a separate main latching pawl, which interact with the pawl in parallel planes and at a distance from each other, is known, for example, from DE 10 2007 003 948 A1. The locking mechanism also has an opening moment in the main latching position, wherein the main latching pawl is secured in its main latching position by means of a latching- or blocking lever. If the main latching pawl engages the rotary latch in a plane of a metallic main body of the rotary latch, the pre-latching pawl acts on a bolt positioned on the rotary latch to implement the pre-latching position of the locking mechanism.

The generic state of the art is embodied by DE 10 2012 207 443 A1. This document discloses a lock for a motor vehicle, in particular a motor vehicle side door lock, having a locking mechanism with a rotary latch and a pawl, wherein the rotary latch can be blocked in a pre-latching position and a main latching position, wherein a pre-latching element of the locking mechanism is formed by an angled region of a metallic main body of the rotary latch. Due to this angling in the metallic main body, a pre-latching element can be implemented by the metallic main body of the rotary latch itself. The provision of the pre-latching element on the rotary latch by the metallic main body itself offers the advantage that the formation of an additional bolt and also the mounting of the bolt on the rotary latch can be dispensed with.

The locking systems and/or locks known from the prior art have basically proven their worth. Proceeding from the prior art, it is always the aim of the developers of locking systems, as well as the automotive industry itself, to provide improved locking systems. The available space in the vehicle, the weight of the locking system, and also the noise behavior play a decisive role. As described above, electromagnets and closing aids are used to increase operating practicality for the vehicle user. The additional functions require a more complex structure of the locking systems and thus an increased number of components, which in turn result in costs and affect the weight of the locking system. This is where the invention comes in.

SUMMARY OF DISCLOSURE

The object of the invention is to provide an improved lock for a motor vehicle. In particular, it is an object of the invention to provide a compact locking system having a high level of functionality and having the smallest possible number of components.

According to the invention, the object is achieved by the features of independent claim 1. Advantageous embodiments of the invention are specified in the dependent claims. It should be noted that the exemplary embodiments described below are not restrictive; rather, any variation of the features described in the description and the dependent claims is possible.

According to claim 1, the object of the invention is achieved in that a lock for a motor vehicle is provided, comprising a locking mechanism with a rotary latch and at least one pawl, wherein the rotary latch can be latched in a pre-latching position and a main latching position, and comprising a main latching pawl and a pre-latching pawl, wherein a pre-latching element of the locking mechanism is formed by an angled region of a metallic main body of the rotary latch, and wherein the angled region can be placed in engagement with a closing pawl of a closing device. The design according to the invention of the motor vehicle lock now makes it possible to implement a compact design of a motor vehicle lock in which a high level of functionality can be implemented with a small number of components. In particular, by using the angled region of the metallic main body of the rotary latch as a pre-latching element and at the same time as a means of implementing a closing device for the locking mechanism, further components, moldings and/or structural means for introducing a force to close the locking mechanism can be dispensed with.

The closing device 30 (FIG. 1) thus interacts directly with the rotary latch and in particular with the engagement surface on the rotary latch, which is also used to implement the pre-latching position in the vehicle lock. The angled region on the rotary latch therefore has a dual function. On the one hand, the angled region can be used to implement a first latching position for closing the locking mechanism and, at the same time, the closing pawl 32 (FIG. 1) can engage with the angled region in order to implement a complete closing, and to reach the main latching position of the locking mechanism. Consequently, a high level of functionality can be provided in the motor vehicle lock with minimal design resources.

The lock according to the invention can be a lock for a tailgate, a side door, a tailgate or roof—but also, for example, for a seat back of a rear seat bench of a vehicle. The invention preferably relates specifically to a lock for a tailgate of a motor vehicle. Special requirements are placed on tailgate locks because, in contrast to sliding door locks, for example, they can be exposed to changing loads. For example, it may happen that the tailgate is stressed by snow loads, so that when it is opened, and especially when it is opened electrically, it must be ensured that the lock is fully open until the loaded tailgate is closed again. For example, if a tailgate is stressed with a snow load, the locking mechanism may be opened electrically, but the latch holder engaging with the rotary latch does not cause any relative movement in the locking mechanism because the tailgate remains in its position due to the heavy load. In this case, the pawl or pawls must be held out of engagement with the rotary latch. Keeping the pawl disengaged when the locking mechanism is unlocked is also called the snow load function.

Regarding the structure of the locking mechanism, please refer to the introductory explanations. The rotary latch has a metallic main body which is pivotably mounted in the vehicle lock via a metallic axle pin. The pivot axis of the rotary latch, as well as of the pawl or pawls, is also held in a metal lock case. This metallic basic structure of the motor vehicle lock can ensure that the pivoting or movable component on the motor vehicle can be held securely even in extreme situations, such as an accident. In the pre-latching and main latching positions, the metal regions of the pawl and the rotary latch are in contact with one another in order to ensure secure locking and, in particular, precise positioning of the locking mechanism.

According to the invention, an angled region is provided on the metallic main body of the rotary latch, wherein the angled region preferably has an angle of 90° to the base surface of the rotary latch and extends beyond the flat extension of the rotary latch. The angled region thus forms a one-piece component with the rotary latch and engages with the pre-latching pawl.

In a further embodiment of the invention, each pawl is assigned a separate switch device. In order to enable a reliable evaluation of the pawl of the locking mechanism, two switch devices, in particular microswitches, are provided in the motor vehicle lock, each of which can detect a position of the locking pawls. This is an advantage, in particular with regard to the electrical operation of the vehicle lock, since the reliable opening and closing of the lock and the reliable detection of the positions of the pawls is possible.

In an advantageous development of the invention, the pre-latching pawl is movable independently of the main latching pawl. On the one hand, an independent movement of the pre-latching pawl ensures that the pre-latching position is reached reliably; and, on the other hand, additional functions can be implemented using the pre-latching pawl.

The reliable reaching of the pre-latching position is also advantageous because if the main latching position is not reached, for example if an object has become lodged in the opening region of the tailgate, the pre-latching pawl can ensure that the tailgate is held in place even during movement of the vehicle.

The further advantage of the independence of the movement of the pre-latching pawl arises if the main latching pawl can be actuated by means of a movement of the pre-latching pawl, in particular if it can be actuated by a movement in the direction of unlocking of the locking mechanism. The pre-latching pawl has an additional function in this case—namely, that the main latching pawl is moved out of the engagement region of the rotary latch. The pre-latching pawl therefore serves not only as a means of blocking the movement of the rotary latch, but also to keep the main latching pawl out of engagement with the rotary latch. This is advantageous in particular if, for example, the aforementioned snow load acts on the motor vehicle. The forced entrainment of the main latching pawl by the pre-latching pawl can therefore ensure reliable unlocking of the locking mechanism even in extreme situations.

A further embodiment of the invention is achieved if, during a movement in the direction of locking of the locking mechanism, the pre-latching pawl can be moved independently of the main latching pawl. This ensures that, on the one hand, the main latching pawl is compelled against the rotary latch, preferably with spring-loading; and also the pre-latching pawl can be moved over the main latching pawl and can fall into the pre-latching element. The main latching pawl therefore slides along the rotary latch, moving in the closing direction, and rests against an outer contour of the rotary latch with spring-loading. The pre-latching pawl can also be spring-loaded and rest against the pre-latching element of the rotary latch, and can fall into the pre-latching element when the rotary latch is in the appropriate position. When the rotary latch moves further in the closing direction, an extension on the pawl ensures that the pre-latching pawl moves further into the engagement region with the rotary latch. If the rotary latch then reaches its main latching position during the closing movement, the main latching pawl can fall into the main latching position of the rotary latch, while at the same time the pre-latching pawl slides along the pre-latching element and rests against the pre-latching element by means of the extension. The entrainment on the pre-latching pawl enables unblocking of the locking mechanism, and the lock can then be opened.

Advantageously, when the locking mechanism is unlocked, both switch devices can be actuated. For this purpose, the pre-latching pawl as well as the main latching pawl each have a separate extension which can be placed in engagement with the respective switch devices. The switch devices are arranged in the motor vehicle lock in such a way that both switch devices, which are preferably designed as microswitches, are actuated in the open position of the locking mechanism. This has several advantages. On the one hand, the exact position of the pawls makes it immediately possible to detect that the lock is in the open state. A further advantage is that the switch devices are activated only when the locking mechanism is in the open position. The period of time during which a motor vehicle lock is open is significantly shorter than the period of time during which the motor vehicle lock is in a closed position. This is simply because a moving or parked motor vehicle is preferably parked or operated with the doors and tailgates closed. The period of time in which the switch devices are actuated is therefore shorter and thus the load on the switch devices is reduced.

A further advantage of a design variant arises if, in a pre-latching position of the locking mechanism, a switch device assigned to the pre-latching pawl is inactive. The ability of the pre-latching pawl to pivot freely in relation to the rotary latch as well as in relation to the main latching pawl allows the position of the locking mechanism and/or the latching position to be clearly detected. If the main latching pawl is spring-loaded against the rotary latch in the pre-latching position and the switch device for the main latching pawl is actuated at the same time, a switch signal can be created by means of the main latching pawl. The pre-latching pawl releases the switch device in the pre-latching position. In other words, the extension of the pre-latching pawl is no longer in contact with the switch device. This electrical circuit allows the pre-latching element in the locking mechanism to be detected clearly.

It is also advantageous if both switch devices are inactive in a main latching position of the locking mechanism. As already explained above, the switch position in which both switch devices are inactive offers the advantage that the switch devices are exposed to a low load during their service life. In addition, the main latching position can be determined reliably, since the switch position of both switch devices can be used to determine clearly whether the main latching position has been reliably reached. To actuate the switch device, both the pre-latching pawl and the main latching pawl can have an extension that can be placed in engagement with the switch device. The extension can be designed in such a way that the switch devices are activated only if the pre-latching position or the main latching position is reached reliably. For example, an incorrect engagement of the main latching pawl would not result in the switch device for the main latching position being activated. A main latching pawl that has fallen only partially into place does not release the switch, so that the risk of reporting a false closure can be avoided. A false closure occurs when the main latching pawl has engaged only partially, so that the main latch can become disengaged when the motor vehicle is operated. This is prevented by the extension arranged on the main latching pawl and in particular the design of the extension in interaction with the switch device.

Advantageously, the pawls can be mounted on the same axis. The pawls are safety-relevant components that must meet requirements even in the event of extreme loads. In other words, the locking pawls must keep the vehicle lock closed even in the event of an accident. For this purpose, the pawls are pivotably mounted on a metal axle, with the metal axle being housed in a lock plate. In addition, a reinforcement plate can be arranged between the pawl axle and the rotary latch axle, which provides additional stabilization of the locking mechanism as a whole. The shared mount of the two pawls on one axle offers the advantage that a compact design of the vehicle lock can be achieved.

It can also be advantageous if the switch devices are arranged in different planes and at a distance from each other in the lock. The arrangement of the switch devices in different planes enables a simple construction of the pawls and a compact formation of a corresponding extension for the interaction of pawls and switch devices. This in turn facilitates the compactness of the vehicle lock and enables a structurally simple design of the locking pawls. The pawls themselves require only a radial embodiment of the extension in order to be able to engage with the switch device.

BRIEF DESCRIPTION OF DRAWINGS

In the following, the invention is explained in more detail with reference to the appended drawings using an exemplary embodiment. However, the principle applies that the exemplary embodiment does not limit the invention, but is merely an advantageous embodiment of the invention. The features depicted can be implemented individually or in combination with further features of the description as well as what is claimed—individually or in combination.

In the figures.

DETAILED DESCRIPTION

Figure 1:
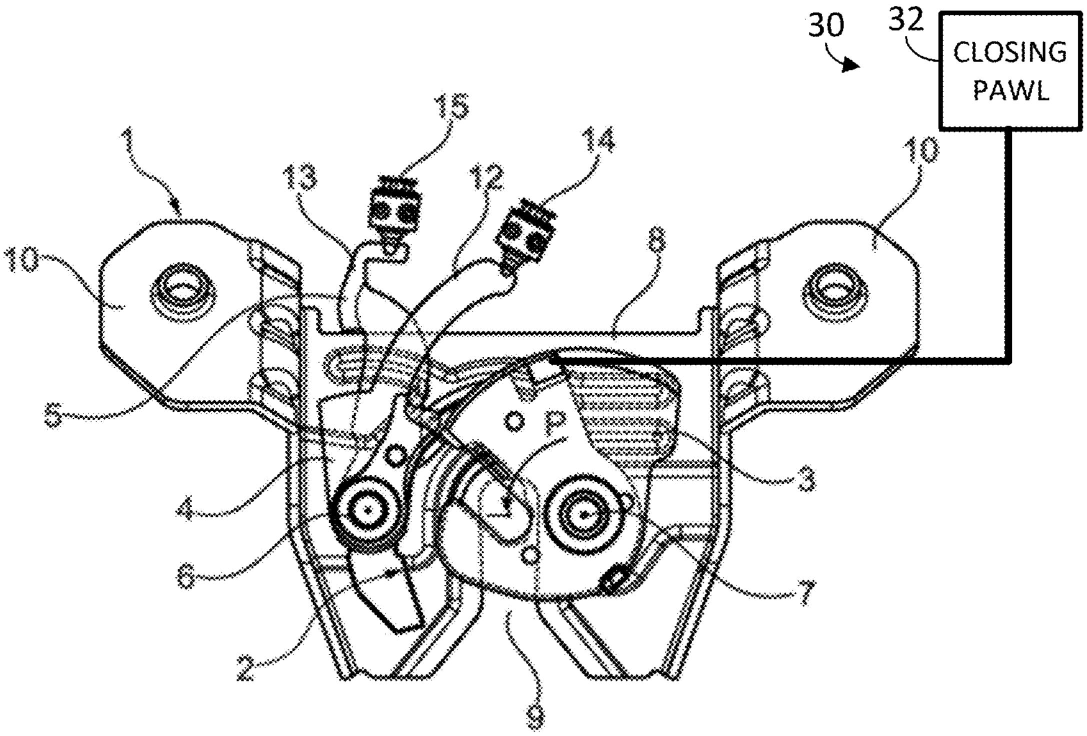
FIG. 1 shows a motor vehicle lock constructed according to the invention in the form of a tailgate lock, in an unlocked position.

FIG. 1 is a motor vehicle lock 1 in a plan view of a locking mechanism 2 in an opened—that is, unblocked—position. The locking mechanism has a rotary latch 3, a pre-latching pawl 4 and a main latching pawl 5. The locking mechanism parts 3, 4, 5 are pivotably mounted in a lock case 8 by means of axles 6, 7. The lock case 8 has an insertion region 9 through which a latch holder (not shown) can interact with the rotary latch 3 in a known manner. The lock case 8 also has brackets 10, 11, by means of which the motor vehicle lock 1 can be fastened to a motor vehicle or a body of the motor vehicle. To explain the invention, only some components of the motor vehicle lock 1 which are essential for explaining the invention are shown. The pawls 4, 5 have extensions 12, 13, which can each be placed in engagement with a switch device 14, 15. The switch devices 14, 15 are shown in FIG. 1 in an actuated position. In other words, the extension 12 of the pre-latching pawl actuates the switch device 14 and the extension 13 of the main latching pawl 5 actuates the switch device 15. In this embodiment, both switch devices 14, 15 are designed as microswitches and are shown actuated.

FIG. 1 shows an unlocked position of the locking mechanism 2, so that the rotary latch 3 is able to move in the direction of the arrow P, i.e. counterclockwise. The movement of the rotary latch 3 is effected by a rotary latch spring (not shown), which loads the rotary latch 3 in the direction of the arrow P, and by a sealing pressure exerted by a tailgate on the vehicle lock or the latch holder. In this open position, the rotary latch is able to release the latch holder and a tailgate can be opened.

Figure 2:
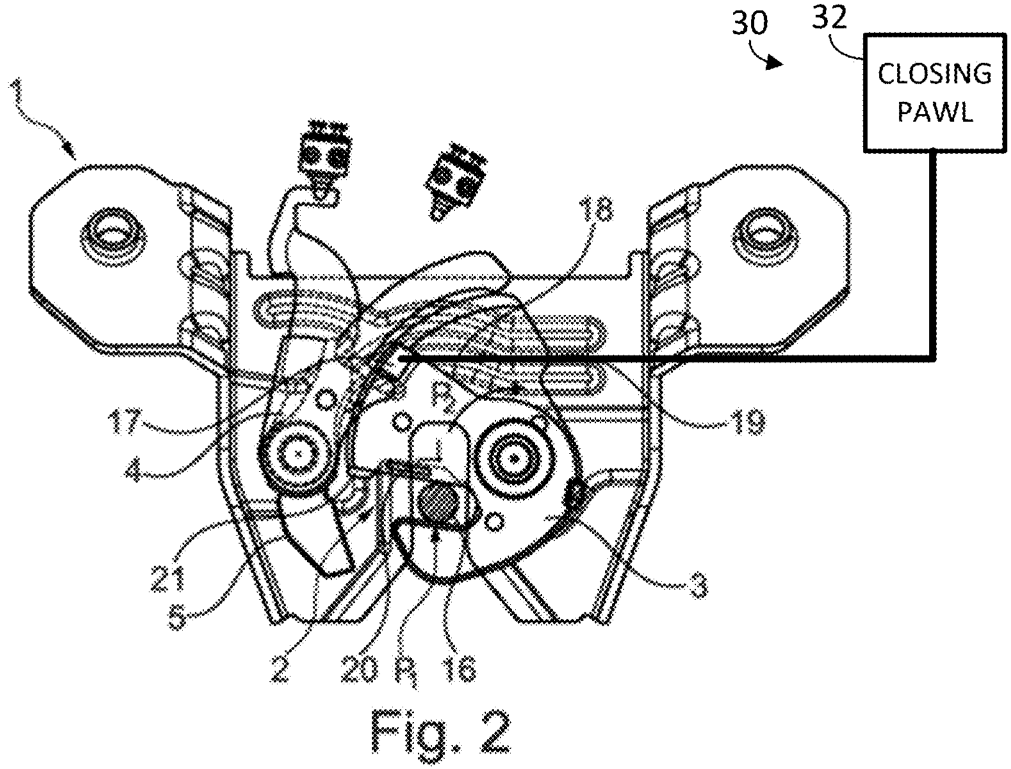
FIG. 2 shows the motor vehicle lock according to the invention as shown in FIG. 1, in a pre-latching position.

FIG. 2 shows the pre-latching position of the locking mechanism 2. After an opening of the motor vehicle lock 1, and a closing of, for example, the tailgate, a latch holder 16 engages with the motor vehicle lock 1—and in particular, the rotary latch 3—from the direction of the arrow P1. This moves the rotary latch 3 in the direction of the arrow P2. The pre-latching pawl 4 as well as the main latching pawl 5 are spring-loaded and rest against the rotary latch 3. When the pre-latching position is reached, as shown in FIG. 2, the pre-latching pawl 4 can fall into a pre-latching element 17 of the rotary latch 3. The pre-latching element 17 is formed in one piece from a metallic main body of the rotary latch 3 and is designed as a bevel in this embodiment.

The metallic main body 18 of the rotary latch 3 is surrounded largely by a plastic sheath in order to enable, for example, guidance of the pawl as well as low-noise interaction between the pawls 4, 5 and rotary latch 3. A low-noise interaction is also made possible by the plastic casing 19 on the rotary latch 3 with the latch holder 16—wherein, for example, additional recesses can be provided on the pawl 3 and in particular in the plastic casing 19 in order to enable noise dampening in the interaction between the rotary latch 3 and the latch holder 16.

The pre-latching pawl 4 is spring-loaded and can be moved in the direction of the rotary latch 3 but can also be moved independently of the main latching pawl 5. The pre-latching pawl 4 can thus fall unhindered into the pre-latching element 17 when the rotary latch is moved in the closing direction P2, for example by the latch holder 16.

Figure 3:
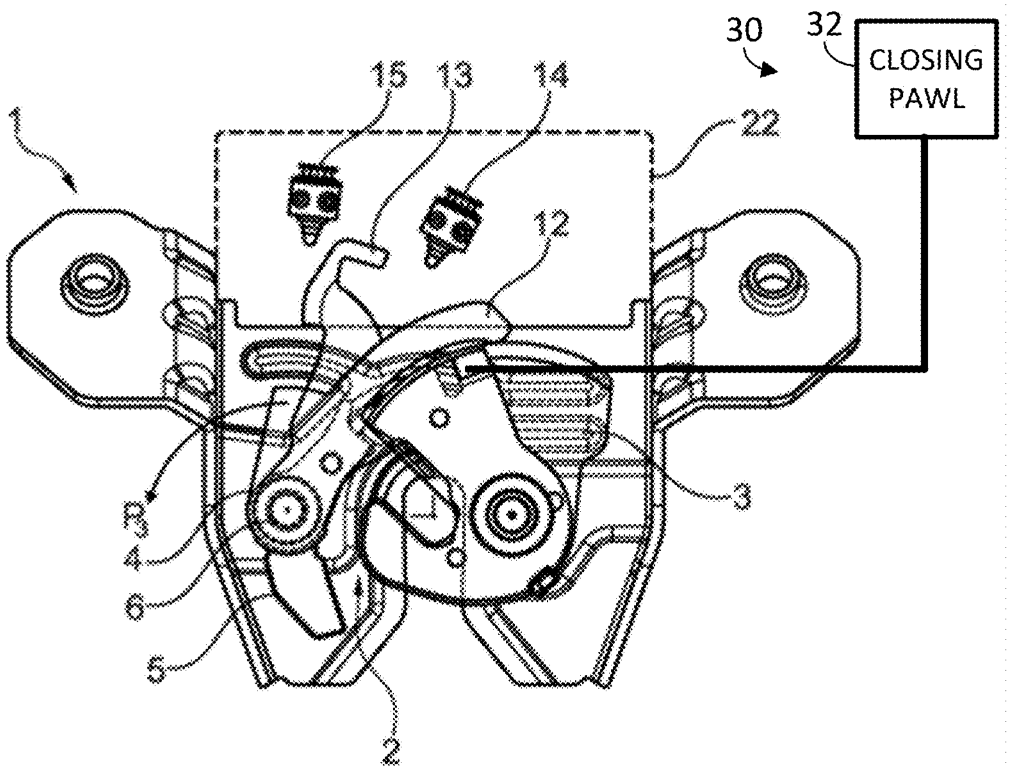
FIG. 3 shows the motor vehicle lock according to the invention in a main latching position.

FIG. 3 shows the closed position of the motor vehicle lock 1, wherein the main latching position of the locking mechanism 2 is shown. The main latching pawl 5 has fallen into the main latch 21 and is resting against the main latch 21. The main latch can be seen better in FIG. 2.

In FIG. 3, it can also be seen that the switch devices 14, 15 have been released from the extensions 12, 13. The switch devices 14, 15 are therefore unloaded. The switch devices 14, 15 can be electrically contacted and held in a plastic housing 22 (indicated schematically) of the motor vehicle lock 1.

Proceeding from FIG. 3, the motor vehicle lock can be opened by moving the pre-latching pawl 4 in the direction of the arrow P around the axle 6. A movement of the pre-latching pawl 4 results in the main latching pawl 5 being carried along by the pre-latching pawl 4. This enables the locking mechanism 2 to be unlocked reliably, as incorrect engagement of the opening locking mechanism or the opening rotary latch 3 into the pre-latching element 17 is prevented. The independent movement of the pre-latching pawl 4 thus enables a reliable unlocking of the locking mechanism 2, and also prevents the pre-latching pawl 4 from accidentally falling into the pre-latching element 17.

Overall, the design according to the invention of the motor vehicle lock 1 makes it possible to implement a compact design of the motor vehicle lock, wherein a high level of functionality can be provided with minimal structural resources.

LIST OF REFERENCE SIGNS

- 1 motor vehicle lock
- 2 locking mechanism
- 3 rotary latch
- 4 pre-latching pawl
- 5 main latching pawl
- 6, 7 axes
- 8 lock case
- 9 insertion region
- 10, 11 brackets
- 12, 13 extension
- 14, 15 switch device
- 16 latch holder
- 17 pre-latching element
- 18 main body
- 19 plastic sheath
- 20 recess
- 21 main latching position
- 22 plastic housing
- 30 closing device
- 32 closing pawl
- P, P1, P2, P3 Arrow

The invention claimed is:

1. A lock for a motor vehicle comprising:

a closing device including a closing pawl, a locking mechanism including: a rotary latch including a metallic main body with a pre-latching element, and a pre-latching pawl having-an-ORG and a main latching pawl, wherein the rotary latch is latched in a pre-latching position and a main latching position, wherein in the pre-latching position of the rotary latch, the pre-latching pawl directly engages the pre-latching element, and wherein the closing pawl of the closing device engages the pre-latching element to move the rotary latch to the main latching position.

2. The lock for a motor vehicle according to claim 1, further comprising a first switch device and a second switch the device, wherein each of the pre-latching pawl and the main latching pawl is operably connected respectively to the first switch device and the second switch device.

3. The lock for a motor vehicle according to claim 1, wherein the pre-latching pawl is configured to move independently of the main latching pawl.

4. The lock for a motor vehicle according to claim 1, wherein the main latching pawl is configured to be actuated by a movement of the pre-latching pawl.

5. The lock for a motor vehicle according to claim 1, wherein, upon a movement in the direction of locking of the locking mechanism, the pre-latching pawl is movable independently of the main latching pawl.

6. The lock for a motor vehicle according to claim 2, wherein, when the locking mechanism is unlocked, the first and second switch devices are actuated.

7. The lock for a motor vehicle according to claim 2, wherein, in the pre-latching position of the locking mechanism, the first switch device assigned to the pre-latching pawl is unactuated.

8. The lock for a motor vehicle according to claim 2, wherein, in the main latching position of the locking mechanism, the first and second switch devices are unactuated.

9. The lock for a motor vehicle according to claim 1, wherein the pre-latching pawl and the main latching pawl are mounted on a same axle.

10. The lock for a motor vehicle according to claim 2, wherein the first and second switch devices are arranged in different planes and are spaced from one another in the lock.

11. The lock for a motor vehicle according to claim 4, wherein the main latching pawl is configured to be actuated upon a movement in a direction of unlocking of the locking mechanism.

12. The lock for a motor vehicle according to claim 3, wherein the main latching pawl is compelled against the rotary latch with spring-loading.

13. The lock for a motor vehicle according to claim 12, wherein the pre-latching pawl moves over the main latching pawl and falls into the pre-latching element.

14. The lock for a motor vehicle according to claim 3, wherein the pre-latching pawl is spring-loaded and rest against the pre-latching element.

15. The lock for a motor vehicle according to claim 2, wherein the first and second switches are micro switches.

16. The lock for a motor vehicle according to claim 2, wherein, when the main latching pawl is spring loaded in the pre-latching position and the second switch device for the main latching pawl is actuated at the same time, a switch signal is created by the main latching pawl.

* * * * *